Aug. 13, 1968    O. B. DUTTON ET AL    3,397,398
DOPPLER RANGE MEASURING SYSTEM
Filed Nov. 28, 1966    2 Sheets-Sheet 1
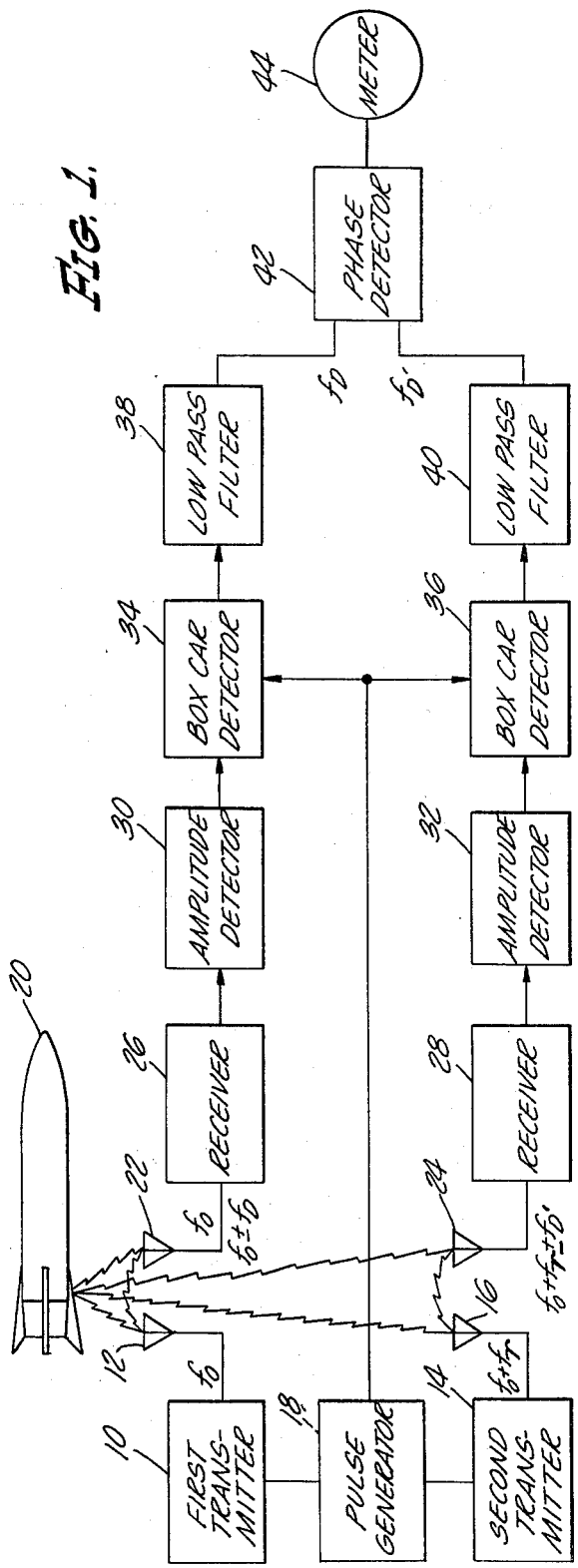
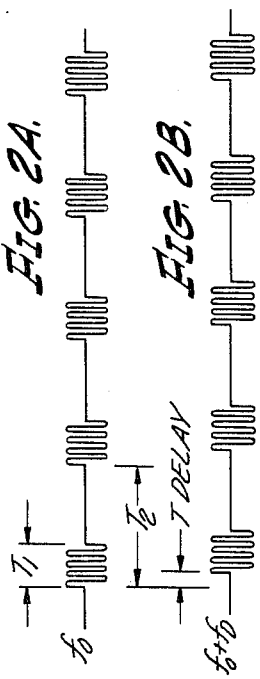
OSCAR B. DUTTON
CHARLES B. PETRY
INVENTORS.
WHANN & McMANIGAL
Attorneys for Applicants
BY Robert W. McManigal

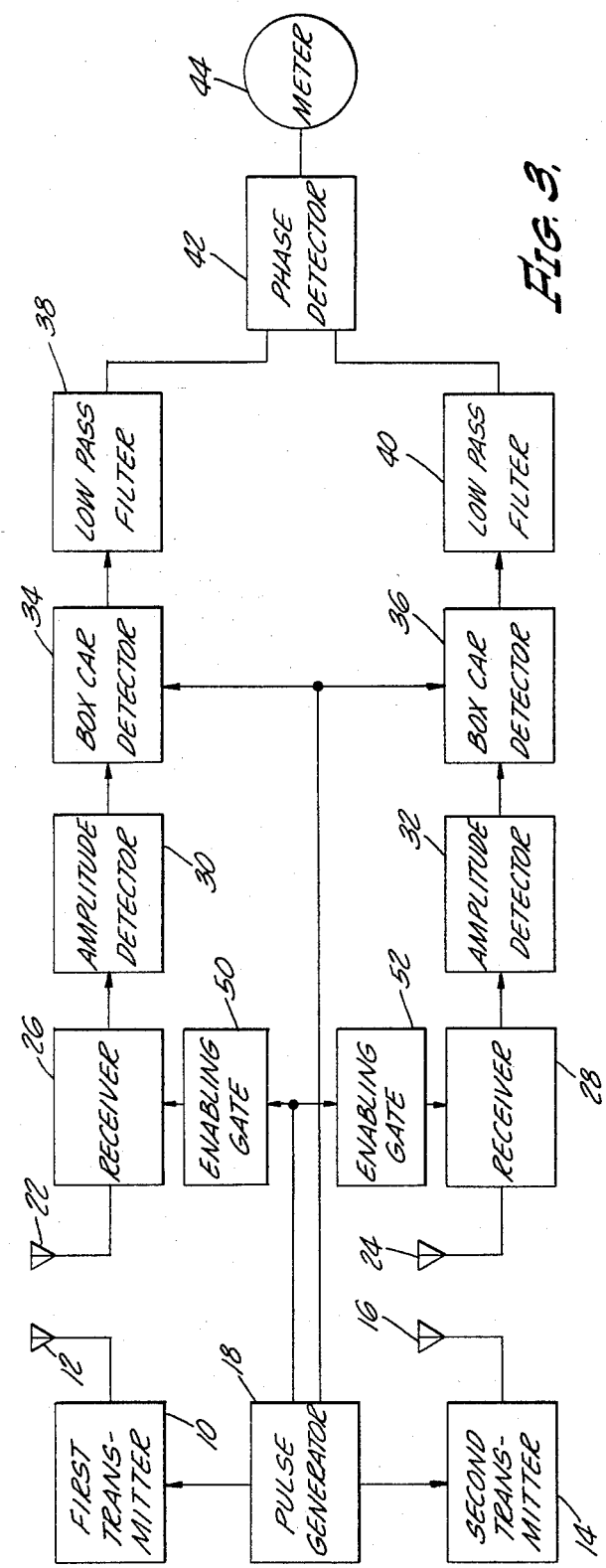
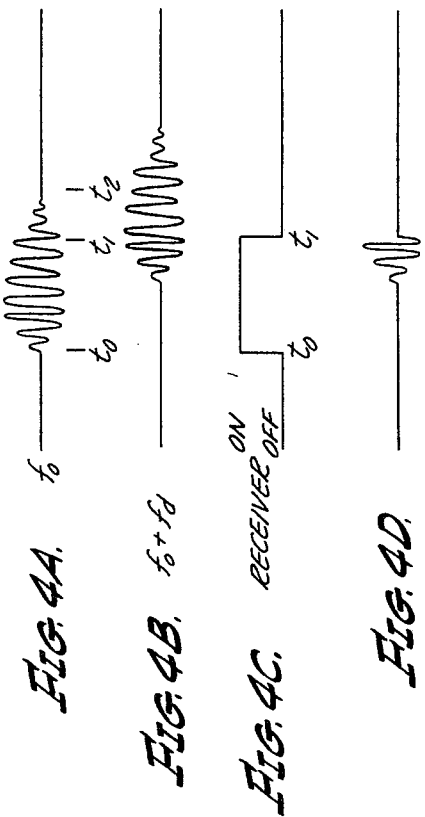

United States Patent Office 3,397,398
Patented Aug. 13, 1968

3,397,398
DOPPLER RANGE MEASURING SYSTEM
Oscar B. Dutton, Palos Verdes Estates, and Charles B. Petry, San Diego, Calif., assignors, by mesne assignments, to Babcock Electronics Corporation, Costa Mesa, Calif., a corporation of California
Continuation-in-part of application Ser. No. 467,590, June 28, 1965. This application Nov. 28, 1966, Ser. No. 597,266
9 Claims. (Cl. 343—13)

ABSTRACT OF THE DISCLOSURE

The specification of this application discloses a radar system for finding the distance to one moving object from another. The system is of the Doppler type in which the Doppler signal is derived by the simultaneous transmission to the target of two CW signals having a small, fixed frequency difference. The two CW signals are pulsed so that the on-time is equal to the time required for a radio signal to travel from the transmitter to the maximum range and back to the receiver. The off-time is made long relative to the on-time so that echoes from targets at most ranges beyond the desired range will not be detected and indicated. In one embodiment, rejection of such long range signals is accomplished by rendering the receiving means inoperative at a time following initiation of a transmitter pulse corresponding to twice the transmit time to the maximum range from the transmitter.

---

This invention relates to radio range measuring devices and, more particularly, is concerned with an improved radio range system for measuring distance between two moving objects in close proximity to the earth.

This application is a continuation-in-part of our copending prior application, Ser. No. 467,590, now abandoned, filed on June 28, 1965, and entitled "Doppler Range Measuring System."

Various systems have heretofore been proposed for measuring the range between two relatively moving objects, such as between two aircraft or between a missile and the target. In such systems, range information is usually only of interest when the two moving objects come within close proximity to each other. The Doppler principle has been used heretofore to provide accurate range information between two relatively moving objects which come in close proximity to each other. One such arrangement is described in Patent No. 3,174,148. However, in such an arrangement, to get a quantitative measurement it is necessary to count individual Doppler cycles generated as the two objects converge.

Another system using the Doppler principle is described in volume 1 of the Radiation Laboratory series by McGraw-Hill Publishing Company, pages 139–143. In this arrangement, two signals of slightly different carrier frequencies are transmitted and reflected back by a moving target. A Doppler shift occurs in both the reflected signals, and quantitative range information is determined by measuring the difference in phase between the Doppler signals.

Such a system is only effective in measuring the range within the extreme limit at which a 360° phase shift exists between the two Doppler signals. At greater ranges, the information becomes ambiguous. Where there are two targets, one of which is beyond the maximum unambiguous range of the system, it is usually possible to eliminate the more remote target from consideration in the measurement by virtue of the much lower signal strength of the reflected signal. However, the two-frequency Doppler system presents a problem where range measurements are to be made between two moving objects in close proximity to the earth. Since the source of the radio waves located at one of the objects is moving, reflecting objects on the earth, such as buildings or hills, also appear as moving targets. The signals reflected from the ground targets produce ambiguous range information and can not be rejected on the basis of signal strength because the ground targets are so much larger and reflect a greater amount of energy than the moving target of immediate interest.

The present invention is directed to a Doppler range measuring system using two different frequencies which substantially eliminates the problem of ground return from ground targets beyond the unambiguous range of the phase measurement, i.e., the ranges in excess of the distance at which the phase measurement between the Doppler signals exceeds 360°.

This is accomplished in brief by providing a Doppler range measuring system in which two radio signals of different frequency are transmitted from the range measuring station located on one of the moving objects, the two radio signals being reflected back to the range measuring station by the other moving object as well as by ground return. The transmitted signals are pulsed and the reflected signals are mixed with the transmitted signals to derive the Doppler shift frequency signals for the two different radio signals. The phase difference between the two Doppler signals is then measured. By pulsing the transmitting signals for a time period which is equal to twice the transit time of the radio signals between the two objects at the maximum range, the reflected signal can only be mixed with the transmitted signal if the reflected signal is from an object within the maximum range or within some range multiple corresponding to the period between pulses of the transmitted wave. The latter condition greatly limits the likelihood of ambiguous range information from ground return.

Alternatively, the receiver may be turned on by an enabling gate for a specified period of time during pulse transmission. The time during which the receiver is turned on determines the maximum range which can be measured. Therefore, instead of controlling the duration of the transmitted pulses to determine the maximum range, it is also feasible to control the maximum range by the time the receiver is gated on.

For a more complete understanding of the invention, reference should be made to the accompanying drawings wherein:

FIGURE 1 is a block diagram of one embodiment of the invention;
FIGURES 2A–2E are waveforms useful in explaining the operation of the circuit of FIGURE 1;
FIGURE 3 is a block diagram of an alternative embodiment of the present invention; and
FIGURES 4A, 4B, 4C and 4D are waveforms useful in explaining the operation of the circuit of FIGURE 3.

Referring to FIGURE 1, the range measuring system includes a first transmitter 10 which transmits signals at a first frequency $f_0$ from an antenna 12. A second transmitter 14 transmits a second radio signal at a frequency $f_0+f_r$ from an antenna 16.

In accordance with the improvement of the present invention, the first and second transmitters 10 and 12 are pulse modulated by a pulse generator 18 which simultaneously turns on both transmitters periodically at pulse time intervals of $T_2$ and for a pulse duration of $T_1$. The waveform of the output of the first transmitter is shown in FIGURE 2A. Radio signals transmitted at the antennas 12 and 16 intercept a moving target 20 and are reflected back to receiving antennas 22 and 24 and applied respectively to receivers 26 and 28. The receivers 26 and 28 may be conventional superheterodyne type of receivers. The receiver 26 is tuned to the frequency $f_0$ of the first transmitter and accepts a narrow band of frequencies corresponding to the maximum Doppler frequency shift, i.e., the Doppler frequency $f_D$ produced by the relative movement of the reflecting target 20 toward or away from the position of the range measuring system. The signal $f_0$ is also applied to the input of the receiver 26 through direct linkage between the antennas 12 and 22, for example. Similarly, the receiver 28 is tuned to the frequency $f_0+f_r$ and has a narrow pass band which includes the Doppler shift frequency $f_D'$ produced by the relative movement of the target 20. The waveform of the reflected wave from the target is shown in FIGURE 2B, the input to the receiver 26 including both the signals of FIGURE 2A and FIGURE 2B.

The outputs of the receivers 26 and 28 are applied to amplitude detectors 30 and 32 respectively. The detectors derive the pulse envelopes of the outputs of the receivers 26 and 28. These pulses occur within the unambiguous range only for a target within the range at which the pulses of the reflected signal overlap in time the pulses of the direct leakage signal. When the range of the target 20 exceeds the maximum range of the system, there is no time overlap between the received signals reflected back from the target and the leakage signal coupled directly between the two antennas and therefore the output of the amplitude detectors goes to zero.

The amplitude of the envelope depends upon the phase relationship between the reflected signal and the direct leakage signal. For example, if the two signals are in phase, they will reinforce each other and the pulse amplitude will be at a maximum, but on the other hand if the two signals are 180° out of phase, they will substantially cancel each other and the pulse amplitude will be at a minimum. It will be evident that if the range of the target 20 is fixed, the amplitude of the pulses does not change, but if the target 20 is moving radially in relation to the range measuring system, the amplitude of the pulses changes with time. The amplitude of the pulses varies at a rate determined by the relative velocity between the target 20 and the range measuring source and therefore corresponds to the Doppler frequency $f_D$, as shown by the dotted line in FIGURE 2C.

Since the width of the pulses at the output of the amplitude detectors varies with range due to the delay of the reflected signal in relation to the leakage signal at the input to the antennas, it is desirable to stretch the pulses at the outputs of the detectors to a constant length by means of "box car" type detectors, as indicated at 34 and 36 respectively. Each box car detector is preferably coupled to the pulse generator 18 as shown and produces pulses of constant width at the pulse repetition frequency of the pulse generator 18, but with the amplitude of the constant width pulses being proportional to the amplitude of the output pulses from the amplitude detectors 30 and 32. The waveform of the output of the box car detector 34 is shown in FIGURE 2D.

The outputs of the box car detectors are then applied to low pass filters 38 and 40 respectively which integrate the waveform to obtain a sinusoidal signal corresponding in frequency to the Doppler shift $f_D$, as shown by the waveform in FIGURE 2E.

For a given radial velocity of the target 20, it will be seen that the Doppler shift frequency $f_D$ and the Doppler shift frequency $f_D'$ resulting from the different frequencies of the two transmitted signals differ slightly because of the difference in the transmitted frequencies. This slight difference in Doppler frequencies gives rise to a phase difference $\phi$ between the two Doppler signals, as shown in FIGURE 2E, which is a linear function of time. Since the target range is also a linear function of time, the phase difference between the two Doppler signals is directly proportional to the range. This relationship is given by the following equation:

$$r = 1/4\pi \times c/f_r \times \phi$$

where $r$ is the range, $f_r$ is the difference frequency between the two transmitted signals, and $c$ is the velocity of light.

Accordingly, to derive range information, the output of the low pass filter 38 and the low pass filter 40 are applied to a phase detector 42. The output of the phase detector is applied to a meter, for example, which can be calibrated directly in range units.

It wil be seen from the wave forms of FIGURE 2A and FIGURE 2B that if the reflected pulse arrives back at the receiver during the period $T_1$, a Doppler shift signal will result due to the heterodyne action between the leakage signal and the reflected signal. However, if the reflected pulse is received after the period $T_1$, no Doppler signal is produced. The period $T_1$ establishes a distance beyond which the system is normally inoperative. However, if the reflected signal is delayed by a full period $T_2$, it will heterodyne with the next transmitted pulse over the narrow range established by the period $T_1$. This can produce an ambiguous range measurement at the meter 44 but is limited to a very narrow band of range by the pulsing operation. Therefore, the chance of getting ambiguous range information as a result of ground reflection is greatly decreased. For example, if the period $T_1$ is 0.2 microsecond and the period $T_2$ is 5 microseconds, the system measures a range from 0 to 100 feet. The system would be capable of producing ambiguous range information at ranges of 2500 to 2600 feet, 5000 to 5100 feet, 7500 to 7600 feet, etc. At any other range it produces no measurement. The system is immune to ground return effects in the ranges of 100 to 2500 feet, 2600 to 5000 feet, etc. It is therefore apparent that the problem of ambiguous range information from ground return is all but eliminated. Even if there is a ground return from 2500 to 2600 feet away, the energy level of the reflected signal from this distance will be sufficiently small compared to reflections from targets within 100 feet to permit easy discrimination.

It should be noted that while ground return has been discussed as a source of ambiguous reflections, the invention is equally applicable to situations where range is measured in the presence of other large moving objects, such as other large aircraft or a cluster of smaller planes. Also, although the preferred embodiment is described as providing simultaneous pulsing of both transmitted signals, because of the integrating effect of the low pass filters in each receiver channel, the pulses at the two frequencies need not occur simultaneously but could be generated alternately, for example.

As pointed out hereinbefore, the maximum range within which the system of FIGURE 1 responds to reflected signal returns or echos is determined by the width $T_1$ of the transmitted pulse (FIGURE 2A). However, if it is necessary to establish the range between two moving targets very precisely, an improved system, as illustrated in FIGURE 3, may be used. This system is particularly useful where it is desired to detect targets of different sizes such as small air-to-air rockets in the presence of specular return from ground or from water. In such a case, not only the width of the pulse but its rise and fall times must be controlled very accurately. It is well known that radio-frequency pulses are not perfectly rectangular. Hence, they have finite rise and fall times which introduce a range error which is a function of the reflective area of the target and consequently of the strength of the received return echo.

The system of FIGURE 3, to which reference is now made, eases the restrictions on pulse width and pulse fall time necessary for a precision determination of the range. However, the pulse rise time is still critical. Since the pulse rise time can generally be improved if pulse width and pulse fall time are not critical, the system of FIGURE 3 will result in an improved performance. It should also be noted that the width or duration of each transmitted pulse, that is, the time from $t_0$ to $t_1$ as shown in FIGURE 4A must be longer than would be the case in the system of FIGURES 1, 2A through 2E.

The system of FIGURE 3 is generally the same as that of FIGURE 1 and similar elements have been designated by the same reference numbers. However, the two receivers 26 and 28 are respectively controlled by a pair of enabling gates 50 and 52 which, in turn, are coupled to pulse generator 18. Thus, as shown in FIGURE 4C the enabling gate produces an output pulse from the time $t_0$ to the time $t_1$. For example, the enabling gates 50 and 52 may develop successive output pulses as shown in FIGURE 4C to turn the receiver on whenever there is a positive going, enabling or gating pulse.

Accordingly, at each of the receivers 26 and 28 there will be received as previously described a portion of the energy transmitted respectively by the first transmitter 10 and by the second transmitter 14. There will also appear a return echo having a frequency which is shifted by the Doppler effect.

The maximum range within which return echos can be received is determined by the width or duration of the pulse developed by the respective enabling gates 50 and 52. Only those echos received between the time $t_0$ and $t_1$ will be mixed with the transmitted pulse shown in FIGURE 4A.

Otherwise, the operation of the system of FIGURE 3 is the same as that of FIGURE 1. In other words, the portion of the original transmitted signal with the frequency $f_0$ will be mixed with the return echo having a ferquency $f_0 + f_D$. Depending on the relative phase between the two signals there will again be an envelope such as shown in FIG. 2C developed by the amplitude detector 30 or 32. The pulses may then be stretched by the box car detector 34 or 36 to obtain a wave shape of the type shown in FIG. 2D where all pulses have equal duration. This signal is then passed through the low pass filters 38 or 40 to derive only the envelope $f_D$ which is the varying Doppler signal. The phase difference between the two Doppler signals obtained from the two low pass filters 48 and 40 is then detected by the phase detector 42 and may be exhibited by the meter 44 which may be calibrated directly in range.

It will be understood that the width of the gate developed by the enabling gates 50 and 52 controls the maximum range rather than the width of the transmitted pulse as is the case in the system of FIGURE 1.

It should be understood that the gate may be applied to another portion of the circuit, that is, also to the amplitude detectors 30, 32 or to the box car detectors 34, 36 rather than to the receivers 26 and 28.

It should be noted that FIGURE 4A shows the pulse transmitted either from antenna 12 or 16. FIGURE 4B shows the received echo pulse having a frequency higher or lower than the original frequency $f_0$ by the Doppler frequency $f_D$. FIGURE 4C shows the enabling pulse, while FIGURE 4D shows the pulse passed by the receiver as controlled by the enabling pulse of FIGURE 4C.

The invention and its attendant advantages will be understood from the foregoing description and it will be apparent that various changes may be made in the form, construction and arrangement of the parts of the invention without departing from the spirit and scope thereof or sacrificing its material advantages, the arrangement hereinbefore described merely by way of example and we do not wish to be restricted to the specific form shown or uses mentioned except as defined in the accompanying claims, wherein various portions have been separated for clarity of reading and not for emphasis.

We claim:

1. A Doppler range measuring system for measuring the range between a first moving object and a second moving object and for rejecting ground return, said system comprising:
   (a) means for transmitting two radio signals at different frequencies;
   (b) means for pulse modulating said two radio signals at a repetition frequency that is high compared to the Doppler shift frequency produced by relative movement between said two moving objects;
   (c) receiving means at said first moving object for receiving said radio signals after reflection back by said second moving object;
   (d) said receiving means including means coupling a portion of the energy in said two radio signals directly to said receiving means and utilizing that energy for separately detecting and filtering said reflected radio signals to segregate the two Doppler shift signals; and
   (e) means for comparing the phases of said two Doppler shift signals, thereby to obtain an indication of the range between said moving objects.

2. A range measuring system as defined in claim 1 wherein the duration of each of the pulses provided by said pulse modulating means is substantially equal to twice the transit time of the radio signals between the two objects at the maximum range to be measured.

3. A range measuring system as defined in claim 1 wherein said receiving means includes an enabling gate coupled to said receiving means for periodically opening said receiving means while radio signals are being transmitted for a period of time substantially equal to twice the transit time of the radio signals between the two objects at the maximum range to be measured.

4. A range measuring system as defined in claim 1 wherein said means for pulse modulating said two radio signals modulates the two radio signals simultaneously.

5. A range measuring system as defined in claim 1 wherein said receiving means further includes box car detecting means for stretching the received radio signals so that successive radio signals have substantially the same duration.

6. The invention defined in claim 1 including means for rendering said receiving means inoperative at a time following initiation of a pulse of said two radio signals substantially equal to twice the transit time of the radio signals between the two objects at the maximum range to be measured until substantially the time of initiation of the succeeding pulse of said two radio signals.

7. A Doppler range measuring system for measuring the range between a first moving object and a second moving object and for rejecting ground return, said system comprising:
   (a) first and second transmitters at said first moving object for generating radio signals at two different radio frequencies;
   (b) means for pulsing both of said transmitters at a repetition frequency that is high compared to the Doppler shift frequency produced by relative movement between said two moving objects;
   (c) first and second receivers at said first moving object for receiving respectively the two signals from said transmitters;
   (d) means for coupling a portion of the transmitted energy directly between said transmitters and receivers and for coupling a portion of the transmitted energy by reflection from said second moving object, said receivers being tuned respectively to the different frequencies of the transmitted signals;
   (e) a pair of amplitude detectors, each being coupled to the output of one of said receivers;
   (f) a pair of low-pass filters, each being coupled to the output of one of said detectors; and
   (g) means for detecting the phase displacement between the outputs of said low-pass filters.

8. A range measuring system as defined in claim 7 wherein the duration of each of the two radio signals transmitted by said transmitters is substantially equal to twice the transit time of the radio signals between the two objects at the maximum range to be measured.

9. A range measuring system as defined in claim 7 wherein gate means are provided for sequentially turning on each of said amplitude detectors during the period while the radio signals are being transmitted for a period of time substantially equal to twice the transit time of the radio signals between the two objects at the maximum range to be measured.

References Cited

UNITED STATES PATENTS

| 3,066,289 | 11/1962 | Elbinger | 343—7.7 |
| 3,168,735 | 2/1965 | Cartwright | 343—14 X |
| 3,262,112 | 7/1966 | Yost et al. | 343—17.2 X |
| 3,302,161 | 1/1967 | Ellison | 343—13 X |
| 3,327,307 | 6/1967 | Miles | 343—7.7 X |

RODNEY D. BENNETT, *Primary Examiner.*

J. P. MORRIS, *Assistant Examiner.*